Figure 1:
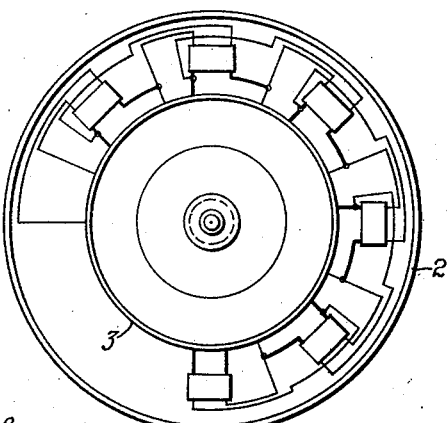

May 29, 1923.

J. SLEPIAN

ELECTROLYTIC CELL

Filed Dec. 9, 1919

1,456,941

WITNESSES:
H. T. Shelhamer
O. E. Bee.

INVENTOR
Joseph Slepian
BY
Wesley G. Carr
ATTORNEY

Patented May 29, 1923.

1,456,941

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTROLYTIC CELL.

Application filed December 9, 1919. Serial No. 343,518.

*To all whom it may concern:*

Be it known that I, JOSEPH SLEPIAN, a citizen of the United States, and a resident of Wilkinsburg, in the county of Allegheny and State of Pennsylvania, have invented a new and useful Improvement in Electrolytic Cells, of which the following is a specification.

My invention relates to electrolytic condensers, lightning arresters and the like, and, more particularly, to apparatus of the above designated character which is formed by employing a plurality of film-forming plates immersed in a suitable electrolyte. The primary object of my invention is to provide an electrolytic cell which shall serve the double purpose of a condenser and lightning arrester and shall be exceptionally effective in either capacity.

Heretofore, many attempts have been made to construct a lightning arrester which would afford absolute protection to electrical apparatus connected to transmission lines, but few attempts have resulted in the provision of structures which could be depended upon. One of the main difficulties in producing a highly effective lightning arrester resides in obtaining a structure which will act quickly enough to provide the necessary protection. Another disadvantage of a great many existing lightning arresters is the fact that they cannot be depended upon after having been in service for some time.

One object of my invention resides, therefore, in the provision of an electrolytic cell which shall afford absolute protection to apparatus connected in a power circuit therewith and which may be depended upon for an indefinite time to act immediately upon any high-voltage surge to effectively discharge the same.

In order to operate an electrolytic condenser consisting of a series of cell units which are connected in series with an electrical power circuit, it is essential that the voltage be equally divided between the several cell units. Although some existing condensers operate satisfactorily for a certain length of time, the unbalanced voltage condition becomes so aggravated after a certain period of operation that the power factor of the condenser becomes excessively high.

One object of my invention resides in the provision of an electrolytic condenser which shall divide the impressed voltage uniformly among its several cell units and operate at a low power factor as long as it is connected in the supply circuit.

A still further object of my invention is the construction of an electrolytic condenser in which an exceptionally low power factor shall exist for the entire period of time during which it is connected to a supply circuit.

With these and other objects in view, my invention will be more fully described, illustrated in the drawings, in the several views of which corresponding numerals indicate like parts, and then particularly pointed out in the claims.

Figure 2:
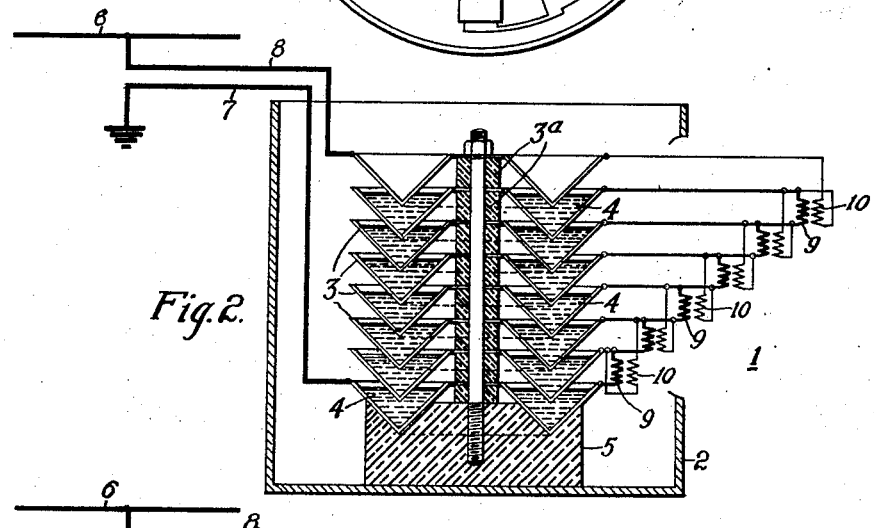
Figure 3:
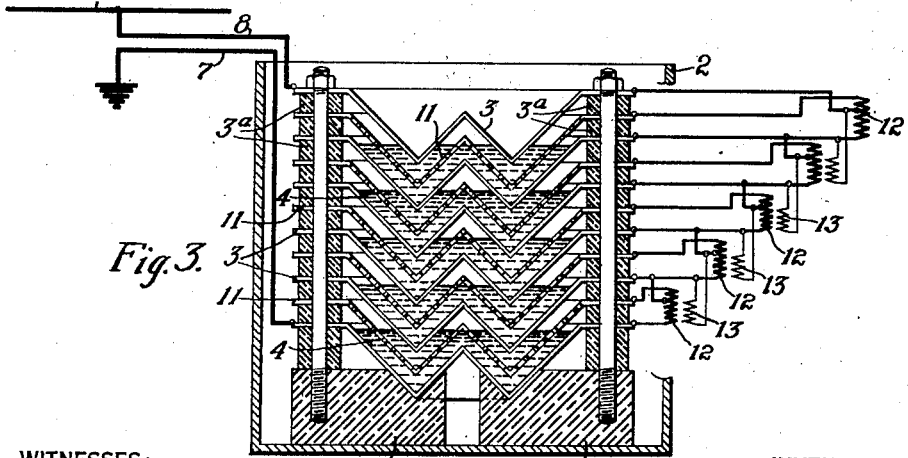

In the drawings, Fig. 1 is a plan view of an electrolytic cell constructed in accordance with my invention; Fig. 2 is a transverse sectional view of the condenser shown in Fig. 1, having the transformers displaced from their position shown in Fig. 1 in order to better illustrate their connection, and Fig. 3 is a transverse sectional view of a modified form of electrolytic cell constructed in accordance with my invention.

In practicing my invention, I may construct an electrolytic cell which may be employed both as a lightning arrester and for power factor correction. The cell may be constructed by employing film-forming materials which may be of any desirable shape to provide suitable electrodes which may be electrically connected by a suitable electrolyte. In following one form of my invention, a plurality of film-forming plates, or trays, may be maintained in spaced relation to form a plurality of cell units. The cell units are formed, for instance, by employing a plurality of trays, some of which act as common electrodes for adjacent cell units. A condenser formed in this manner may be connected in series with an electrical supply circuit by connecting the upper and lower electrodes to the supply line and to ground, respectively. The electrodes of each cell unit may be connected by a winding which is inductively related to a second winding of the same number of turns and which is connected to the cell unit embodying the first winding and to the next cell unit in series therewith. By connecting the various cell units, which are in series, between the ground and the supply line, and by employing a primary and a secondary winding of a small transformer having a ratio of 1, the voltage may be equally divided between the various cell units.

The principle of my invention may be incorporated in a modified form of electrolytic cell which embodies certain advantageous features, such as set forth in a copending application, Serial No. 316,169, filed by me on August 8, 1919. In this application, is disclosed an auxiliary electrode, preferably of much less area than a plurality of main electrodes, that may have a higher alternating voltage impressed thereon than the voltage impressed upon the main electrodes to maintain the main electrodes always positive with respect to the solution in which they are immersed. I may employ this advantageous feature in the electrolytic cell above described by inserting an auxiliary electrode in each of the cell units and by connecting the winding, which is connected to the main electrodes of the various cell units, to the auxiliary electrode also. The number of turns of the winding included between the main electrodes of each cell, however, are preferably of a less number than the turns included between one of the main electrodes and the auxiliary electrode. A higher voltage is thus impressed upon the auxiliary electrode and the attending advantageous features thereof are obtained.

In Figs. 1 and 2 is shown an electrolytic cell 1 comprising a casing 2 in which a plurality of electrodes or trays 3, which are held in spaced relation by suitable supporting members 3ª. An electrolyte 4 may be disposed between the various trays 3 which may be disposed in the casing 2 in any suitable manner, as indicated at 5. The trays or electrodes 3 may be formed of any suitable film-forming material, such as titanium, magnesium or aluminum, and the electrolyte 4 may be of any desirable composition. The extreme upper and lower trays each serve as a single electrode for one cell unit, but the intermediate trays act as electrodes for adjacent cell units by being disposed in contact with the electrolyte 4. The various trays 3 containing the electrolyte 4 comprise a plurality of cell units made up, for example, at the bottom of the stacked trays by the upper surface of the lower tray and the under surface of the next tray. This constitutes one cell unit while the next cell unit is formed by the electrolyte engaging the upper surface of the tray second from the bottom and the lower surface of the next tray in the series. The various trays 3, together with the electrolyte 4, constitute an electrolytic condenser or lightning arrester which may be connected from a supply line 6 to ground by conductors 7 and 8, the conductor 8 being connected to the top tray, and the conductor 7 being connected to the lower tray of the series. The number of trays or electrodes employed depends upon the voltage of the supply circuit which must be divided up between the various cell units of the condenser 1.

The voltage may be uniformly divided among the various units by connecting a primary winding 9 to two adjacent electrodes of a cell unit and a secondary winding 10 may be connected, at one side, to one electrode to which the primary winding is connected and, at its other side, to an adjacent plate of the next cell unit in series. The primary and secondary windings of the small transformers are thus connected to the cell units and equalize the voltage between the cell units because the voltage of each secondary winding is the same as the voltage of each primary winding and the adjacent cells must, therefore, have the same voltage impressed upon them. The transformers connected to the condenser 1 are disposed about the condenser, but are shown in Fig. 2 in displaced relation, in order to clarify the manner of connecting them. Fig. 1 illustrates the manner in which the transformers would be disposed within the casing 2 in practice. Ordinarily, the number of cell units will be sufficiently great to require a sufficient number of the small transformers to extend completely around the casing. The transformers need not be disposed in any particular relation with respect to the casing, or the trays, except as required by the space in which they must be confined.

A distinct advantage is obtained by employing a plurality of small transformers which are connected to the various cell units, as above described, in that the voltage is equally divided between the cell units and the transformers are not expensive to construct. The employment of the transformers obviates the necessity of utilizing some external means to equalize the voltage between the cell units which would necessitate the passing of a multiplicity of high-tension leads through the casing. The transformers are not subjected to exceptionally high voltages and, for this reason, do not require exceptionally heavy insulation. The voltage between the windings of the small transformers, and between the windings and the core of each transformer, is only that corresponding to a single cell, which will ordinarily not exceed 300 volts.

In Fig. 3 is shown a modified form of my invention in which auxiliary electrodes 11 are employed, which are preferably of less area than the main electrodes 3. The auxiliary electrodes 11 are disposed between the main electrodes and may be of the same material and of the same general dimensions. The decreased area of the auxiliary electrodes may be obtained by employing either perforated plates or plates constructed of coarse mesh material. In the form of condenser shown in Fig. 3, however, it is essential, in order to obtain the advantages of the auxiliary electrode, that the primary windings 12 be provided with additional turns, so that each auxiliary electrode may be connected to one of the main electrodes in such manner that the number of turns of the windings 12 included between each of the auxiliary electrodes 11 and one of the main electrodes is greater than the number of turns included between the main electrodes connected by the primary windings 12. The secondary windings 13 are connected in substantially the same manner as described for the condenser 1, shown in Figs. 1 and 2.

The primary windings, of the small transformers employed in the cell shown in Fig. 3, have additional turns in order that the auxiliary electrodes may have a higher voltage impressed upon them than is impressed upon the main electrodes. Certain advantages are obtained from such a combination because each auxiliary electrode assures that its main electrodes shall be maintained positive at all times with respect to the electrolyte. It will, of course, be understood that the number of turns in the primary windings between the main electrodes and the number of turns in the secondary windings are the same, so that a ratio of transformation of 1 is obtained, as in the cell shown in Figs. 1 and 2.

Although I have shown the cells as constructed by employing trays of film-forming material for electrodes, it will be obvious that electrodes of various shapes may be utilized to construct a cell in accordance with my invention. My invention broadly comprises the employment of a practical means for insuring an equal division of voltage between various cell units which constitute an electrolytic condenser or lightning arrester and is not restricted to any particular form of construction of the cell.

An electrolytic cell, constructed in accordance with my invention and connected in series with a power circuit, affords absolute protection to electrical apparatus connected therein because any tendency to suddenly increase the voltage of the circuit produces a short circuit to that high voltage through the condenser. Furthermore, the protective action of the condenser is established immediately when a surge of energy is caused in the circuit.

Although I have shown and specifically described a plurality of electrolytic cells which may be constructed in accordance with my invention, it is obvious that minor changes may be made in the construction of the electrodes and in the selection of the electrolyte, as well as the electrical connections shown therefor, to provide a cell in accordance with my invention, and I desire, therefore, that no limitations shall be imposed except such as are indicated in the appended claims.

I claim as my invention:—

1. An electrolytic condenser, lightning arrester or the like comprising a plurality of cell units, each cell unit including a plurality of film-forming electrodes and a suitable electrolyte and means for equalizing the voltage between the cell units, said means including a winding connected between the electrodes of one unit and another winding inductively related to the first winding and connected to adjacent cell units.

2. An electrolytic condenser, lightning arrester or the like comprising a plurality of cell units, each cell unit including a plurality of film-forming electrodes and a suitable electrolyte and means for equalizing the voltage between the cell units, said means including a winding connected to the electrodes of one unit and another winding, having the same number of turns and inductively related to the first winding, connected to the cell unit containing the first winding and to an adjacent cell unit.

3. An electrolytic condenser, lightning arrester or the like comprising a plurality of cell units, each cell unit including a plurality of electrodes, an auxiliary electrode and a suitable electrolyte, means for equalizing the voltage between the cell units and means for impressing a higher voltage on the auxiliary electrode than is impressed upon the other electrodes.

4. An electrolytic condenser, lightning arrester or the like comprising a plurality of cell units, each cell unit including a plurality of film-forming electrodes, an auxiliary film-forming electrode of less area than the other electrodes and a suitable electrolyte, means for equalizing the voltage between the cell units and means for impressing a higher voltage on the auxiliary electrode than is impressed on the other electrodes.

5. An electrolytic condenser, lightning arrester or the like comprising a plurality of cell units, each cell unit including a plurality of electrodes, an auxiliary electrode, a suitable electrolyte, a winding connected to the electrodes and to the auxiliary electrode of each cell unit and another winding, inductively related to the first winding, connected to the cell unit containing the first winding and to an adjacent cell unit.

6. An electrolytic condenser, lightning arrester or the like comprising a plurality of cell units, each cell unit including a plurality of electrodes, an auxiliary electrode, a suitable electrolyte, a winding connected to the electrodes and to the auxiliary electrode of each cell unit and another winding, having the same number of turns as the first winding to which it is inductively related, connected to the cell unit including the first winding and to an adjacent cell unit.

7. An electrolytic condenser, lightning arrester or the like comprising a plurality of cell units, each cell unit including a plurality of main electrodes, an auxiliary electrode, a suitable electrolyte, a winding so connected to the main electrodes and to the auxiliary electrode of each cell unit as to include a less number of turns between the main electrodes than between one main electrode and the auxiliary electrode and another winding, having the same number of turns as the number of turns in the first winding included between the main electrodes, inductively related to the first winding and connected to the cell unit containing the first winding and to an adjacent cell unit.

8. An electrolytic condenser, lightning arrester or the like comprising a plurality of cell units, each cell unit including a plurality of main electrodes, an auxiliary electrode of less area than the main electrodes, a suitable electrolyte, a winding so connected to the main electrodes and to the auxiliary electrode of each cell unit as to include a less number of turns between the main electrodes than between one main electrode and the auxiliary electrode and another winding, having the same number of turns as the number of turns in the first winding included between the main electrodes, inductively related to the first winding and connected to the cell unit containing the first winding and to an adjacent cell unit.

In testimony whereof, I have hereunto subscribed my name this 8th day of December, 1919.

JOSEPH SLEPIAN.